March 20, 1973  D. E. ERICKSON  3,721,353
COMBINED BATTERY CASE, COUNTERWEIGHT AMD OVERHEAD GUARD
Filed Dec. 14, 1970  4 Sheets-Sheet 1

INVENTOR
DENNIS E. ERICKSON
BY
*J. P. Wienke*
ATTORNEY

March 20, 1973 D. E. ERICKSON 3,721,353
COMBINED BATTERY CASE, COUNTERWEIGHT AMD OVERHEAD GUARD
Filed Dec. 14, 1970 4 Sheets-Sheet 3

FIG. 3

INVENTOR
DENNIS E. ERICKSON
BY
ATTORNEY

March 20, 1973   D. E. ERICKSON   3,721,353
COMBINED BATTERY CASE, COUNTERWEIGHT AMD OVERHEAD GUARD
Filed Dec. 14, 1970   4 Sheets-Sheet 4

INVENTOR
DENNIS E. ERICKSON
BY
ATTORNEY

United States Patent Office

3,721,353
Patented Mar. 20, 1973

3,721,353
COMBINED BATTERY CASE, COUNTERWEIGHT
AND OVERHEAD GUARD
Dennis E. Erickson, Battle Creek, Mich., assignor to
Clark Equipment Company
Filed Dec. 14, 1970, Ser. No. 97,830
Int. Cl. B26d 25/00
U.S. Cl. 214—38 CA                    11 Claims

ABSTRACT OF THE DISCLOSURE

A battery case, counterweight and overhead guard assembly for battery driven lift trucks in which the truck chassis provides a main central upward projection registrable with an opening in a fork receiving member which depends from the bottom of the assembly and which is in turn registrable with an opening in the chassis. Vertical open pockets are provided at opposite sides of the assembly for receiving the vertical legs of an overhead guard which is otherwise unsecured to the assembly. The assembly, plus a battery receivable in the battery case, is removable from the truck, as by a second lift truck or an overhead crane, either in parts or as a complete assembly.

BACKGROUND OF THE INVENTION

The field of art to which the invention pertains includes vehicle chassis.

It is often desirable to utilize a lift truck in the hold of a ship, for example, in order to move cargo to and from a hatchway area. Electric lift trucks have become increasingly popular for such use because of their clean operating characteristics. Heretofore, lift trucks have been ordinarily lifted by ship booms from the dock into the hold of the ship, but frequently because of a lack of capacity of the lifting boom various means have been devised to permit relatively fast disassembly and individual handling of the two major sub-assemblies of an electric lift truck, viz., a first sub-assembly comprising primarily the combined battery and counterweight structure, and a second sub-assembly comprising the remainder of the truck. Thus separated the lift truck can be readily handled as two separate units by most ship booms, and can be reassembled either in the hold or on the dock. In order to satisfactorily remove and reinstall the above assembly in relation to the main lift truck chassis means have been provided heretofore which permit a second lift truck to engage, remove and reinstall the said first sub-assembly. U.S. Pats. 3,367,441 and 3,497,090 disclose various structures for combining the battery, battery case and counterweight, and, in the latter patent, the overhead guard.

SUMMARY

My invention concerns improvements in the construction of the subject combination, particularly in its structural relationship to the chassis of a lift truck so as to provide a relatively low cost, safe, and highly efficient construction enabling the quick removal and installation relative to the truck chassis of the entire combination or of parts thereof by any lifting means available and without positively securing any part of the combination in relation to any other part or in relation to the truck chassis. The invention includes an improved registrability of mateable parts of the battery case and the truck chassis, and a quickly detachable overhead guard which is impositively mounted on the truck in transversely spaced vertical pocket portions of the battery case.

It is a primary object of my invention to provide an improved structure combining a battery case, counterweight and overhead guard per se, and in combination with a lift truck chassis.

It is another object to provide in such a combination means which minimizes the time and expertise required to remove and install the combined battery case, counterweight and overhead guard in relation to a lift truck chassis, the battery being optionally handled either as a part of the combination or separately, and at the same time to provide a relatively low cost and rugged construction.

Another object of the invention is to enable the removal and installation of the overhead guard with maximum facility.

BRIEF DESCRIPTION OF THE DRAWING

FIG. 3 is a plan view of a portion of the lift truck shown in FIG. 1 showing especially the subject combination and associated truck chassis.

DESCRIPTION OF THE PREFERRED EMBODIMENT

Figure 1:
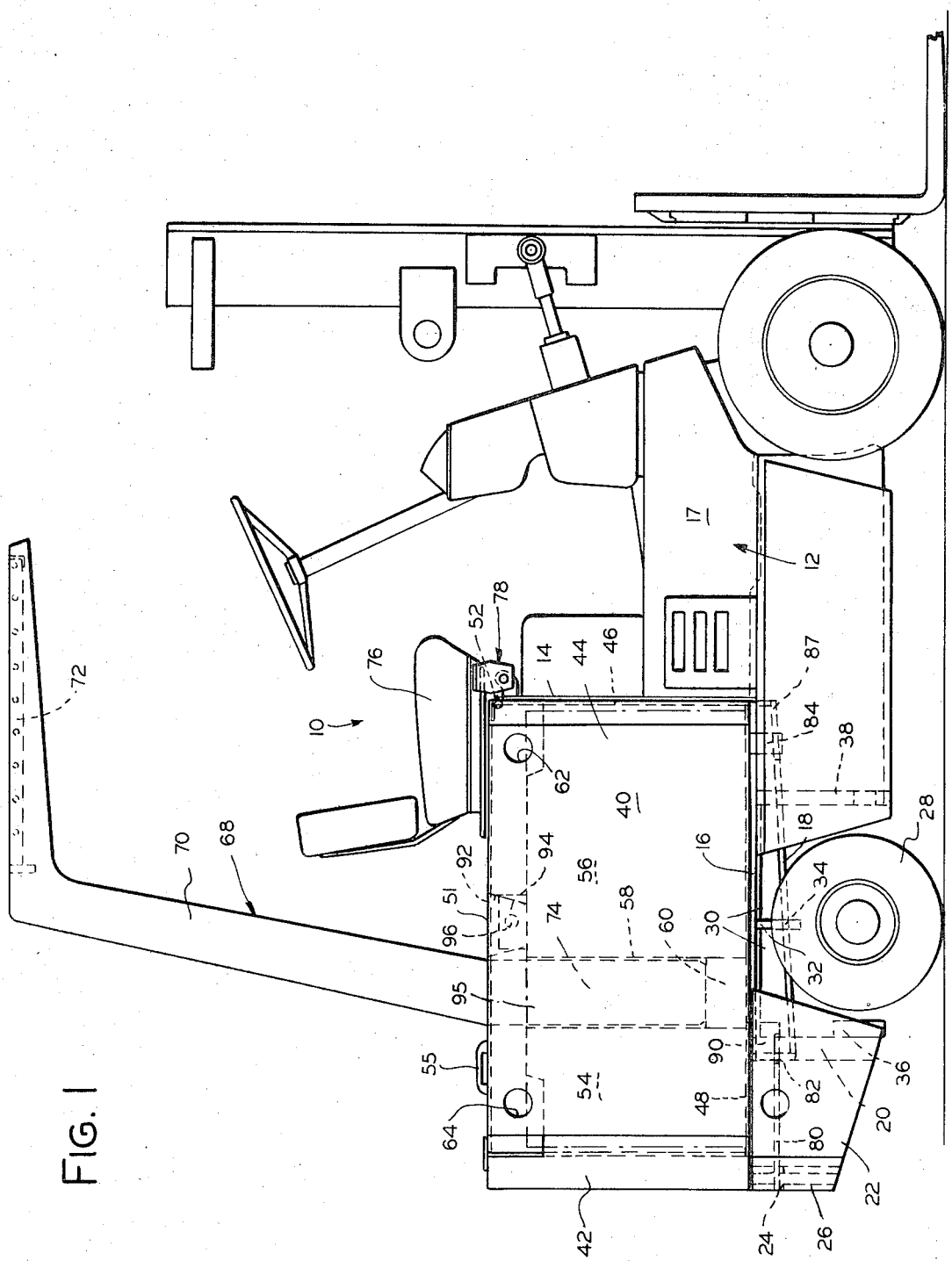
FIG. 1 is a side view of a lift truck embodying my invention.

Referring now to the drawing, a lift truck is shown generally at numeral 10; it includes a chassis 12, a vertical transversely extending plate 14 secured, as by welding, to a pair of transversely spaced, longitudinally extending platform members 16 and to a pair of side frame members 17. An upwardly and forwardly inclined ramp or plate member 18 is supported from and below platform members 16 by side plate members 19, and is secured at the front and rear to plate member 14 and to a transversely extending frame member 20, respectively. A forwardly opening U-shaped rear body plate 22 is secured to the side edges of frame member 20; it defines an upwardly opening, transversely extending U-shaped cutout 24 in the rear plate portion 26 thereof. Space is provided for turning through a relatively wide steering angle the steer wheels 28 by a pair of frame cutout portions 30 formed in the plates 18 and 19 adjacent each wheel 28 as shown, a central support bar 32 of each plate 19 being connected to a projection 34 of plate 18 on each side. A steer axle and power steering means, not shown, are adapted to be supported for transverse articulation from a rear mounting block 36 secured to frame member 20 and a forward and transversely extending mounting plate 38.

A combined battery case and counterweight 40 comprises a transversely extending rear counterweight portion 42, side plate assemblies 44, a front plate 46, a bottom plate portion 48 secured at its periphery to the four sides, and a top cover plate 51 pivoted from plate portion 46 at 52 for forward pivotal movement to expose the interior of the battery case or a truck drive battery which is adapted to be carried therein. A handle 55 may be used to open cover 51. Each side plate assembly 44 comprises a pair of transversely spaced plates 50 and 52, having secured therebetween a pair of solid counterweight elements 54 and 56 which are spaced longitudinally to form a downwardly opening passage 58 closed at the bottom by a block 60 which is connected to each pair of counterweight elements 54 and 56. Longitudinally spaced openings 62 and 64 are formed at the upper corner portions of each outer plate 50 for receiving hook portions of an overhead lifting device, in FIG. 4, which may be used to remove from the rear portion of the truck as a unit the battery case and counterweight assembly and any battery contained therein, as well as the overhead guard to be described.

Figure 4:
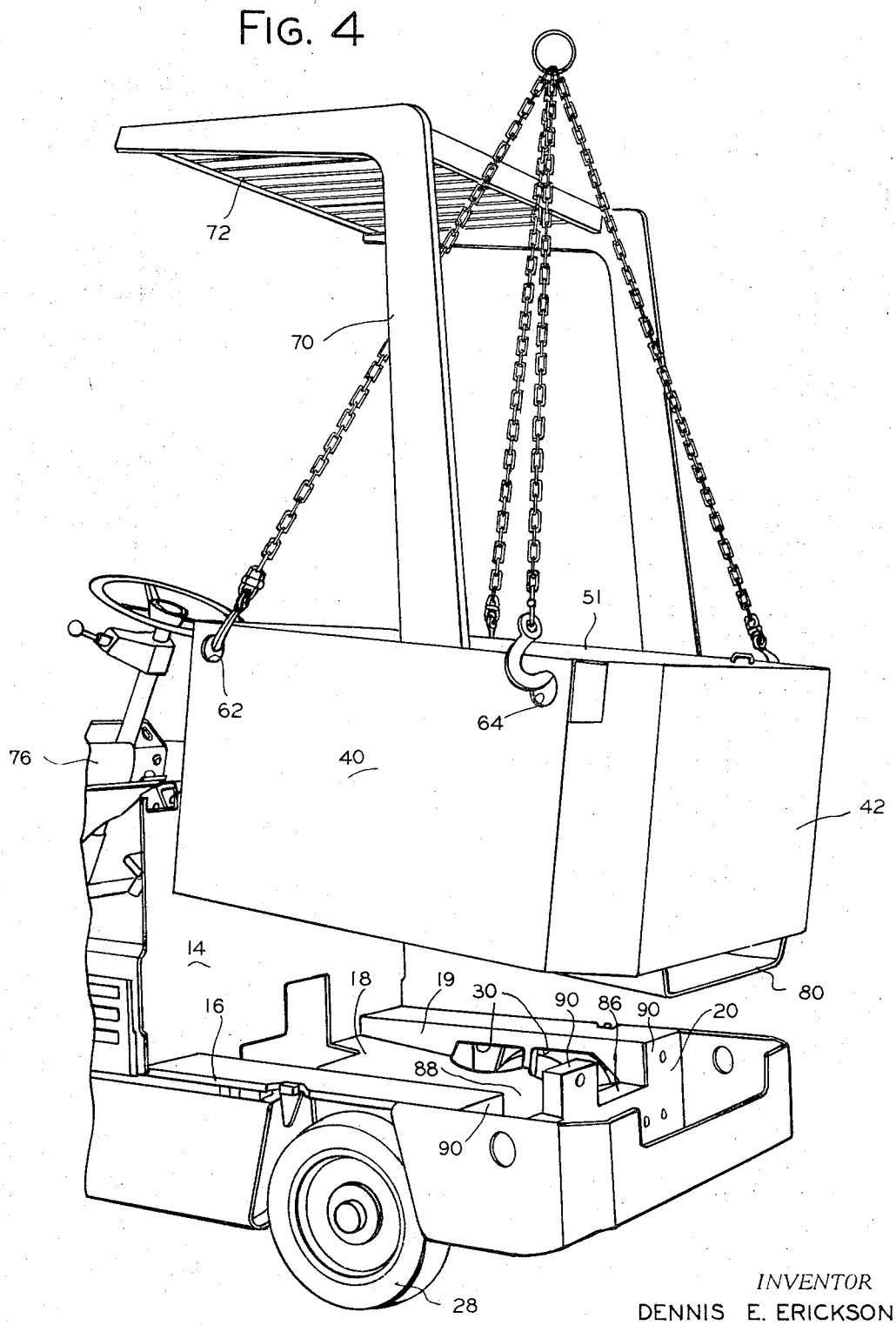
FIG. 4 is a perspective view showing a crane removing from or installing on the lift truck the subject combination.

A driver's overhead guard assembly 68 comprises a pair of transversely spaced inverted generally L-shaped leg members 70 which extend forwardly over the operator's station and are secured together along the horizontal leg portions by a protective grid 72, the rear legs being inclined, as shown, to the upper plate level of the battery case and then extending vertically downward to form lower leg portions 74 which are adapted to be received in the pair of passages 58 for securing the guard impositively in the side portions of the battery case and counterweight, the guard being supported in a vertical direction by block members 60. An operator's seat 76 is mounted on a pivoted swing-out assembly 78 for movement from the operative position of FIG. 1 to a swing-out position transverse of the truck in which the seat 76 faces rearwardly. A portion of the seat assembly in such swing-out position is shown in FIG. 4. The seat and mounting means are the subject of separate patent application Ser. No. 34,713, filed May 5, 1970, assigned to the assignee of the present application.

The combined battery case and counterweight assembly is supported from the truck chassis as follows: Depending from the floor plate 48 of the assembly is a rearwardly and centrally located U-shaped member 80 having a centrally and forwardly located opening 82 in the base thereof. A forwardly located U-shaped leg 84 depends from plate 48 and is of the same depth as member 80 so that the assembly is adapted to stand level on a floor when removed from the truck and deposited. An opening 87 is disposed in ramp plate 18 primarily for permitting access to certain truck components, not shown, when the assembly 40 is removed, leg 84 being so positioned as to register with a portion of opening 87 when the assembly is supported from the truck. Opening 87 is substantially larger in both dimensions than is leg 84. U-shaped bracket member 80 is adapted to register in the passageway between platform member 16 as provided by the construction of the chassis and to extend rearwardly through rear plate cutout 24. The entire assembly 40 is supported, therefore, on longitudinally extending members 16. The transverse frame member 20 is interrupted or cut out at notches 86 and 88 to form three transversely spaced projections 90, the outer ones of which are secured to the ends of plates 16 and 19 and the central one of which projects through opening 82 with relatively small clearance, thereby to engage and positively retain bracket 80, and therefore assembly 40, on the chassis so that the said assembly cannot shift transversely or longitudinally of the truck, but can be readily and without interference elevated therefrom and deposited thereon since there is no positive connection in a vertical direction. The battery case and counterweight assembly abuts vertical chassis plate 14 when the assembly is mounted on the truck.

Cutouts 92 are formed centrally of the upper edge portion of the inner battery container plate 52 and forwardly of passageways 58, thereby facilitating access to a pair of centrally located brackets 94 which are secured to and extend upwardly from the sides of a battery outlined at numeral 95. The brackets 94 have openings 96 therein engageable, for example, by the hooks of an overhead crane, whereby the battery can be removed from and installed in the battery case without necessarily removing either the assembly 40 from the truck or the overhead guard from the latter assembly.

Figure 2:
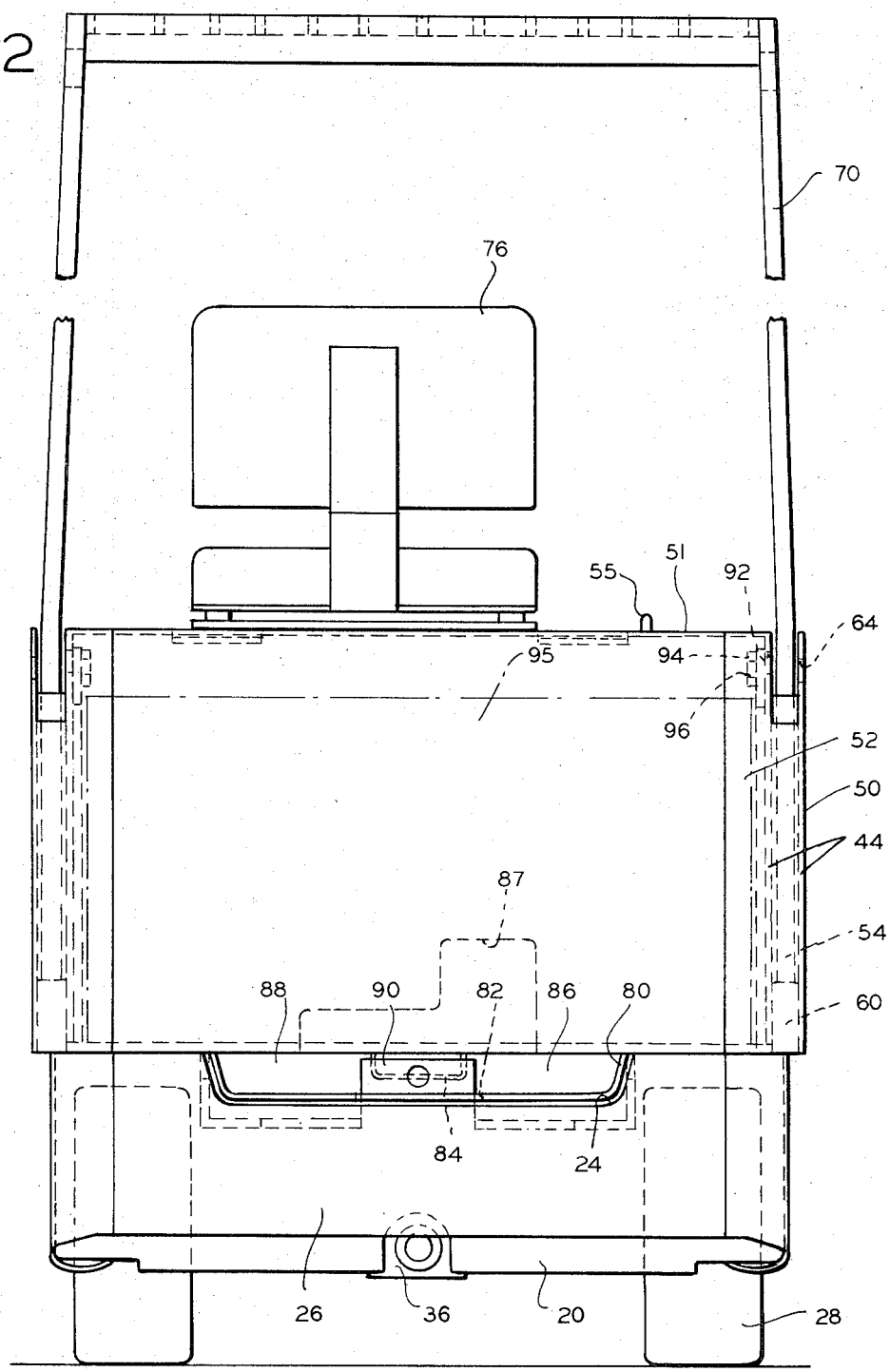
FIG. 2 is a rear view of a portion of the lift truck shown in FIG. 1 showing especially the subject combination and truck chassis.

In operation, the complete assembly of the battery case, battery, counterweight and overhead guard is normally located on the truck chassis in the position shown in FIGS. 1–3 in which the said assembly is held positively against movement in any direction in a horizontal plane, but impositively held against movement in a vertical direction above the supporting chassis platform. As mentioned above, swing-out movement of operator's seat 76 and forward upward pivotal movement of cover plate 51, with or without separate removal of overhead guard 68, enables selective removal and installation of battery 95 by means of overhead engagement with brackets 94 by a crane or the like to lift out or install the battery. In a battery removal sequence with the overhead guard in place, for example, the battery is first moved vertically out of the battery case and then rearwardly between legs 70. If the guard has been previously removed the battery may be moved to the rear or to either side of the truck after it is disengaged from the battery case. On the other hand, as mentioned above, the entire combination may be removed as a single unit simply by engaging pairs of openings 62 and 64 and elevating the assembly from its engagement with the supporting chassis, and opening 87 and projection 90, again with or without separate removal of the overhead guard. Alternatively, the entire assembly, with or without the battery installed, may be engaged by the fork tines of a second lift truck which are inserted through U-shaped bracket 80 in straddling relation to projection 90, after which they are elevated to diseangage the assembly from the chassis of truck 10 and then transported to a selected destination by the second fork truck. The latter method of handling provides greater mobility than is ordinarily provided by an overhead crane operation, although either is suitable depending upon the layout and equipment available in the particular area in which such trucks are operated. FIG. 4 illustrates one of the above means of handling the complete assembly. It should be noted that ramp plate 18 is angled upwardly and forwardly so as to provide both an entryway for the fork tines and sufficient vertical space near the rear end of the truck for vertical cutout portions 30 to provide open spaces sufficient to enable wheels 28 to be turned to a maximum turn angle in either direction without interference. The design also enables the use of a standard lift truck chassis design without any special provisions for the stevedoring application except projection 90 and cutout portion 24 in rear chassis plate 26. As a consequence a relatively low cost design is effected with chassis parts substantially standardized to ordinary sit-down electric lift truck specifications, while at the same time I have provided a design enabling an extremely fast means of deposit and removal of the combination assembly with or without the battery or overhead guard per se, all of which provides a substantial improvement of prior designs of trucks of the type herein contemplated.

Although I have described and illustrated a preferred embodiment of my invention, it will be understood by those skilled in the art that modifications may be made in the structure, form and relative arrangement of parts without necessarily departing from the spirit and scope of the invention. Accordingly, it should be understood that I intend to cover by the appended claims all such modifications which fall within the scope of my invention.

I claim:

1. A battery operated lift truck comprising a lift truck chassis having a rear platform, a battery case adapted to rest on said platform, a pair of transversely spaced generally vertically extending openings formed in the opposite sides of said battery case, and an overhead guard device having a pair of downwardly extending and transversely spaced legs adapted to be received in said openings, each said side of said battery case forming one of said openings by transversely spaced inner and outer longitudinal members and longitudinally spaced forward and rearward counterweights.

2. A battery operated lift truck comprising a lift truck chassis having a rear platform, a battery case adapted to rest on said platform, a pair of transversely spaced generally vertically extending openings formed in the opposite sides of said battery case, an overhead guard device having a pair of downwardly extending and transversely spaced legs adapted to be received in said openings, a centrally located upwardly extending projection in said chassis, a generally U-shaped bracket depending from the bottom of said battery case, and an opening in said bracket adapted to register with said projection when the case is located on said platform in order to prevent shifting of the case in either a longitudinal or transverse direction while permitting movement of the case in a vertical direction without interference.

3. A battery operated lift truck comprising a lift truck chassis having a rear platform, a combined battery case and counterweight assembly adapted to rest on said platform and being quickly removable therefrom as a unit, an upwardly projecting member located centrally of the rear portion of the chassis, and an upwardly opening, longitudinally extending U-shaped bracket depending from the bottom of the battery case and having an opening formed in the base thereof which is adapted to register with said projecting member when the battery case is located on the platform for preventing any substantial longitudinal or lateral movement of the battery case relative to the platform, said U-shaped bracket forming a pocket adapted to receive fork tines of a second lift truck in straddling relation to said projecting member when the battery case is supported by the platform.

4. A lift truck as claimed in claim 3 wherein a vertical transversely extending plate member is located generally centrally of the lift truck and forms an abutment plate for the forward end of the battery case when it is located on the platform and in registry with said projection.

5. A lift truck as claimed in claim 3 wherein said rear platform comprises a pair of longitudinally extending, transversely spaced support elements located at opposite sides of the chassis, a central plate assembly forming with said support elements a longitudinally extending well or chassis compartment, said projection extending upwardly from the chassis from a location below the support elements, said chassis compartment being adapted to receive the forward portion of the U-shaped bracket of the battery case.

6. A lift truck as claimed in claim 5 wherein a rear transverse chassis plate is spaced rearwardly of said projection and defines a U-shaped cutout which is adapted to receive the rear portion of the battery case bracket.

7. A lift truck as claimed in claim 3 wherein said battery case forms a pair of downwardly extending openings at each side thereof for receiving the legs of a cantilevered overhead guard device, said battery case being engageable to disengage the battery case, counterweight and overhead guard assembly from the truck by the fork of a lift truck inserted into the battery case bracket.

8. A lift truck as claimed in claim 7 wherein a battery means is located in said battery case and is adapted to be disengaged from the truck with the battery case as aforesaid or is independently disengageable from the battery case when the latter is located on the chassis, said battery means being elevatable up and out of the battery case and between the legs of the overhead guard device and replaceable in a reverse sequence.

9. A lift truck as claimed in claim 1 wherein said inner and outer longitudinal members prevent substantial transverse movement of the respective downwardly extending leg and said longitudinally spaced forward and rearward counterweights prevent substantial longitudinal movement of each such leg.

10. A lift truck as claimed in claim 1 wherein said transversely spaced legs are held in said openings by gravity force without being secured against elevation out of said openings.

11. A lift truck as claimed in claim 2 wherein said transversely spaced legs are held in said openings by gravity force without being secured against elevation out of said openings.

References Cited

UNITED STATES PATENTS

| | | | |
|---|---|---|---|
| 3,367,441 | 2/1968 | Schuster et al. | 180—68.5 |
| 3,497,090 | 2/1970 | Daniels | 214—38 CC |

OTHER REFERENCES

Clark Equipment Sales and Product Information, No. I-3-1-(7), February 1968.

ROBERT G. SHERIDAN, Primary Examiner

U.S. Cl. X.R.

180—68.5; 187—9; 214—Dig. 7